March 19, 1968      R. M. WATTS      3,373,922
CONTAINER AND BLANKS FOR MAKING THE SAME
Filed July 16, 1965      5 Sheets-Sheet 1
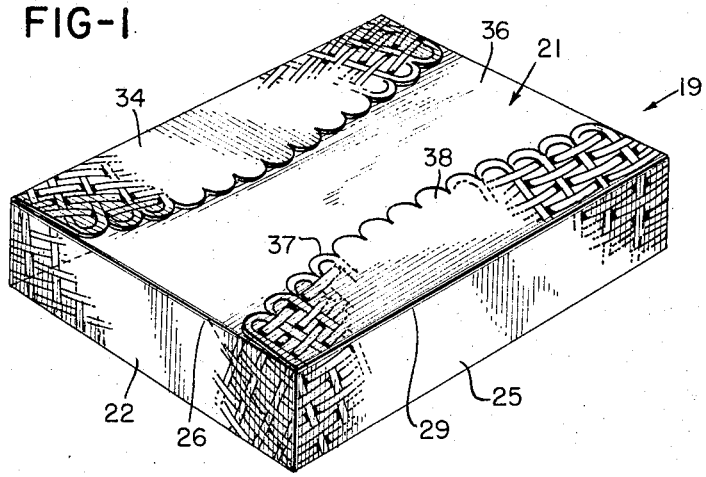
*INVENTOR*
RICHARD M. WATTS
BY
HIS ATTORNEYS March 19, 1968  R. M. WATTS  3,373,922
CONTAINER AND BLANKS FOR MAKING THE SAME
Filed July 16, 1965  5 Sheets-Sheet 2
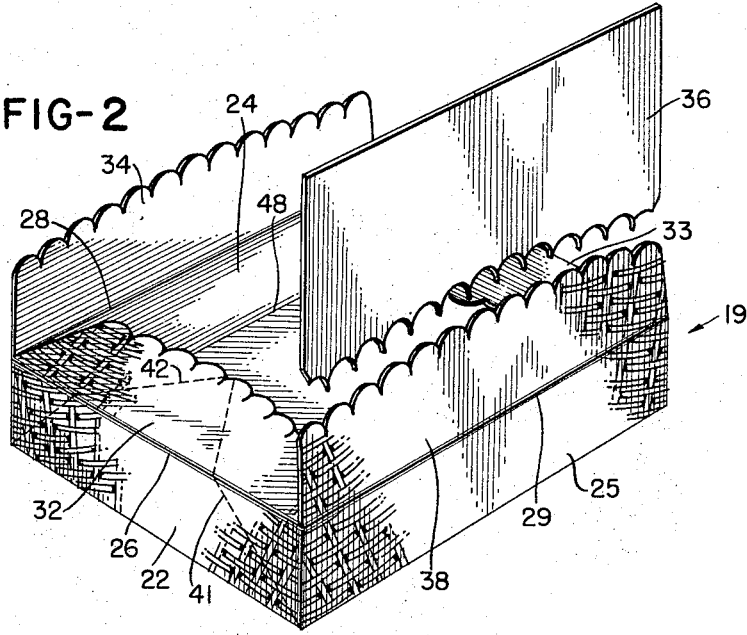
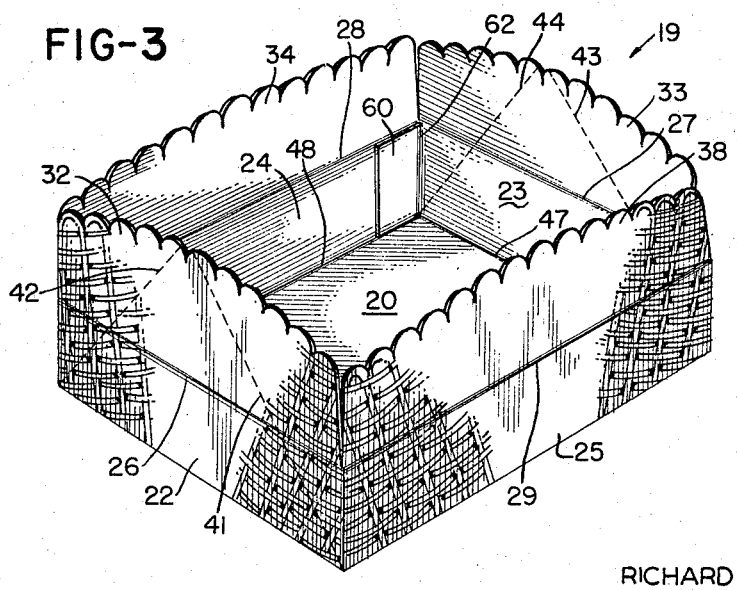
INVENTOR
RICHARD M. WATTS
BY *Glenn, Palmer & Matthews*
HIS ATTORNEYS March 19, 1968  R. M. WATTS  3,373,922
CONTAINER AND BLANKS FOR MAKING THE SAME
Filed July 16, 1965  5 Sheets-Sheet 3

INVENTOR.
RICHARD M. WATTS
BY *Glenn Palmer*
*& Matthews*
HIS ATTORNEYS

March 19, 1968 R. M. WATTS 3,373,922
CONTAINER AND BLANKS FOR MAKING THE SAME
Filed July 16, 1965 5 Sheets-Sheet 4
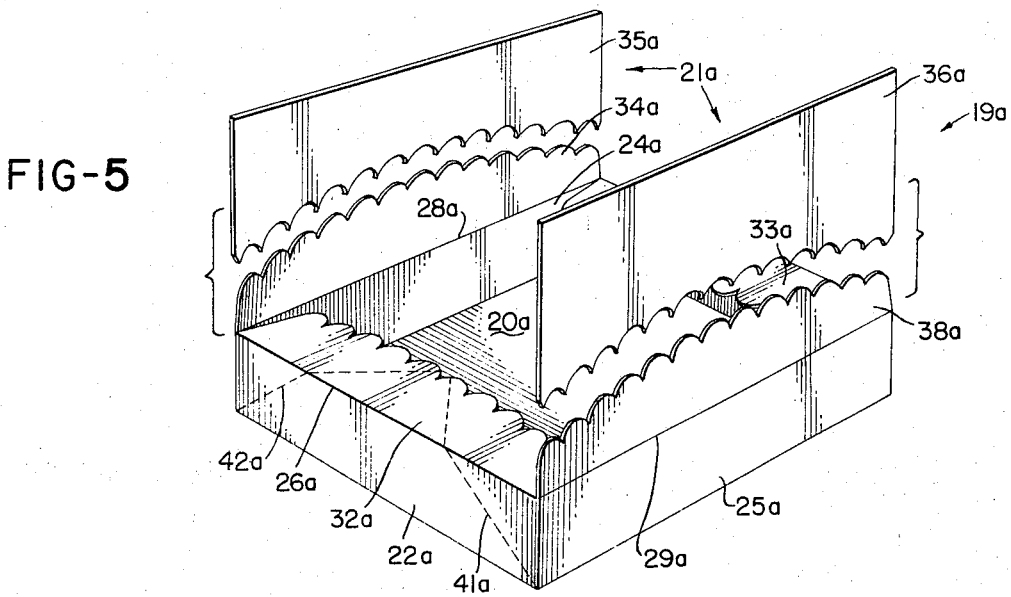
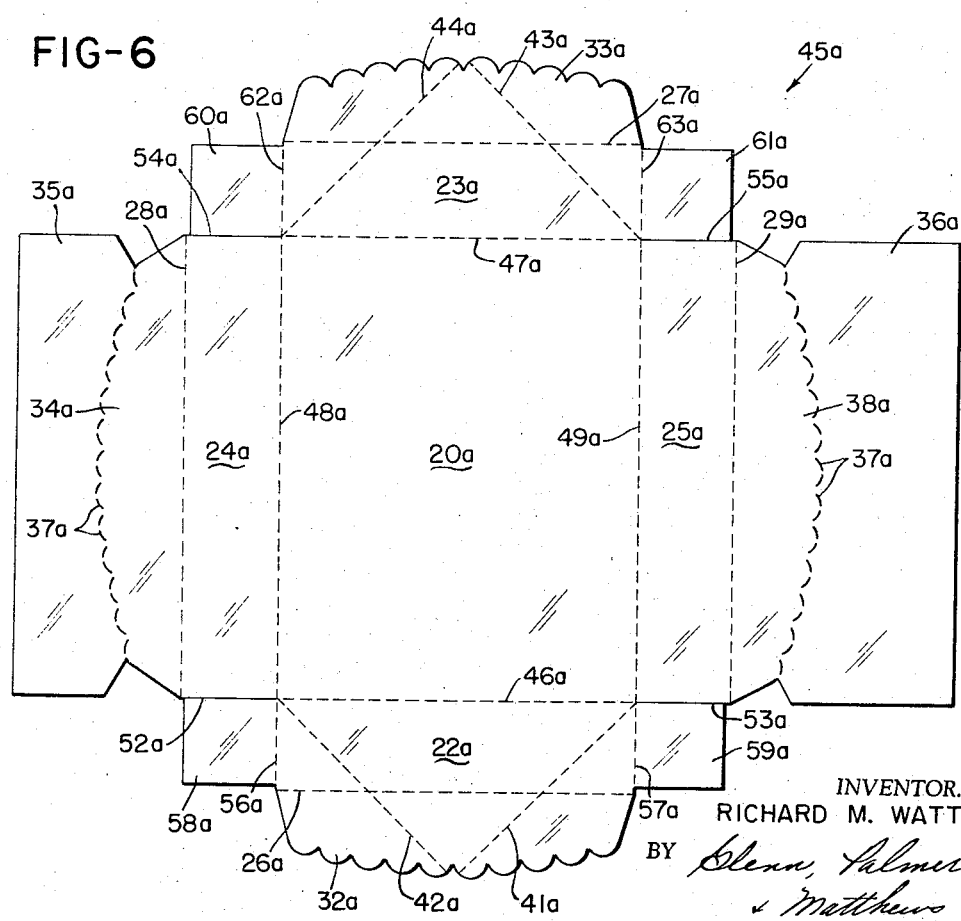
INVENTOR.
RICHARD M. WATTS
BY Glenn, Palmer & Matthews
HIS ATTORNEYS

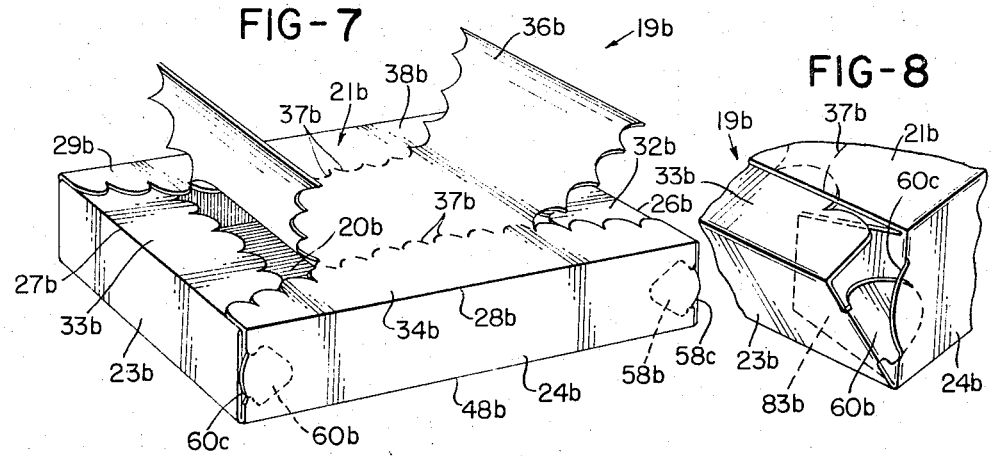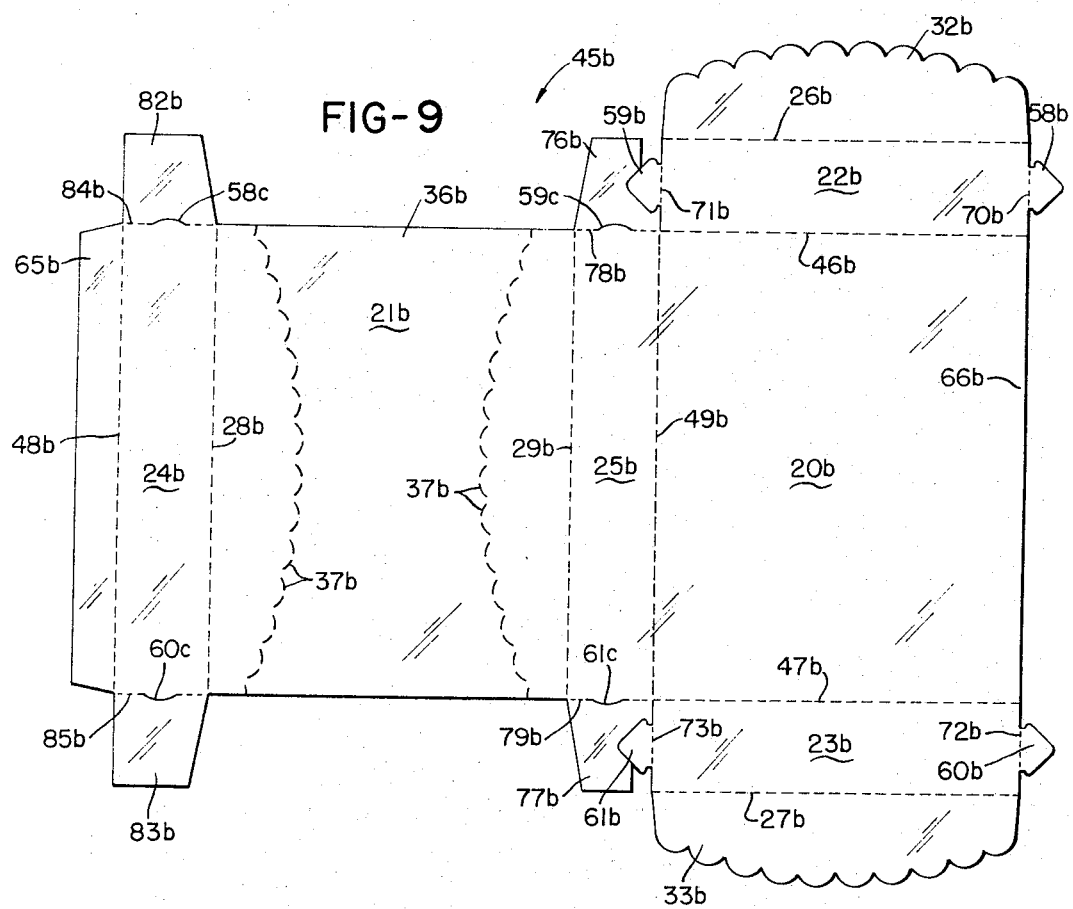

United States Patent Office 3,373,922
Patented Mar. 19, 1968

3,373,922
CONTAINER AND BLANKS FOR
MAKING THE SAME
Richard M. Watts, Henrico County, Va., assignor to Reynolds Metals Company, Richmond, Va., a corporation of Delaware
Filed July 16, 1965, Ser. No. 472,537
19 Claims. (Cl. 229—33)

ABSTRACT OF THE DISCLOSURE

This disclosure relates to a preassembled collapsible container which serves the dual purpose of containing a product, such as a food product, for example, for sale thereof and then may be used to define a comparatively deep serving receptacle or dish from which such food product may be eaten merely by severing away a portion of the top wall of such container and folding the remaining portion of such top wall outwardly to define vertical extensions for its side walls.

---

This invention is related to design application D. 86,189 filed July 16, 1965 and now Design Patent No. D. 206,964.

This invention pertains to an improved container and more particularly to improved food containers and to improved blanks for making such containers or the like.

The packaging and sale of food is a highly competitive field in which the food container itself often influences the sale.

Accordingly, it is a feature of this invention to provide an economical container which has aesthetic appeal while providing maximum utility.

Another feature of this invention is the provision of such a food container which can be folded flat while empty and which is easily erected without complicated assembly operations to enable filling such container with food, while also having the advantageous feature of being usable as a specially designed food dish for serving the particular food previously stored therein.

Therefore, it is an object of this invention to provide an improved container having one or more of the novel features of this invention set forth above or hereinafter shown or described.

Another object of this invention is to provide improved container blanks for such a container or the like.

Other objects, uses and advantages of this invention are apparent from a reading of this description which proceeds with reference to the accompanying drawings forming a part thereof and wherein:

FIGURE 1 is a perspective view of one embodiment of an improved container of this invention.

FIGURE 2 is a perspective view of the container of FIGURE 1 illustrating the manner in which the extended surface of the side wall forming a top wall is torn away leaving an extension flap for such side wall.

FIGURE 3 is a perspective view of the container of FIGURE 1 with the extended area used for the top wall torn away and illustrating extension flaps in the side walls folded vertically to form a dish.

FIGURE 5 is a perspective view illustrating another embodiment of an improved container of this invention in which two opposed side walls have extended cooperating tear-off areas which fold into a common plane to form a top wall.

FIGURE 6 is a plan view of an improved container blank of this invention adapted to form the container illustrated in FIGURE 5.

FIGURE 7 is a perspective view illustrating still another embodiment of an improved container of this invention with the side wall extension flaps being formed by tearing out a central portion of the container top wall.

FIGURE 8 is an enlarged fragmentary view showing the locking arrangement for fastening the end walls to the side walls in the container illustrated in FIGURE 7.

FIGURE 9 is a plan view of an improved container blank of this invention adapted to form the container illustrated in FIGURE 7.

Figure 4:
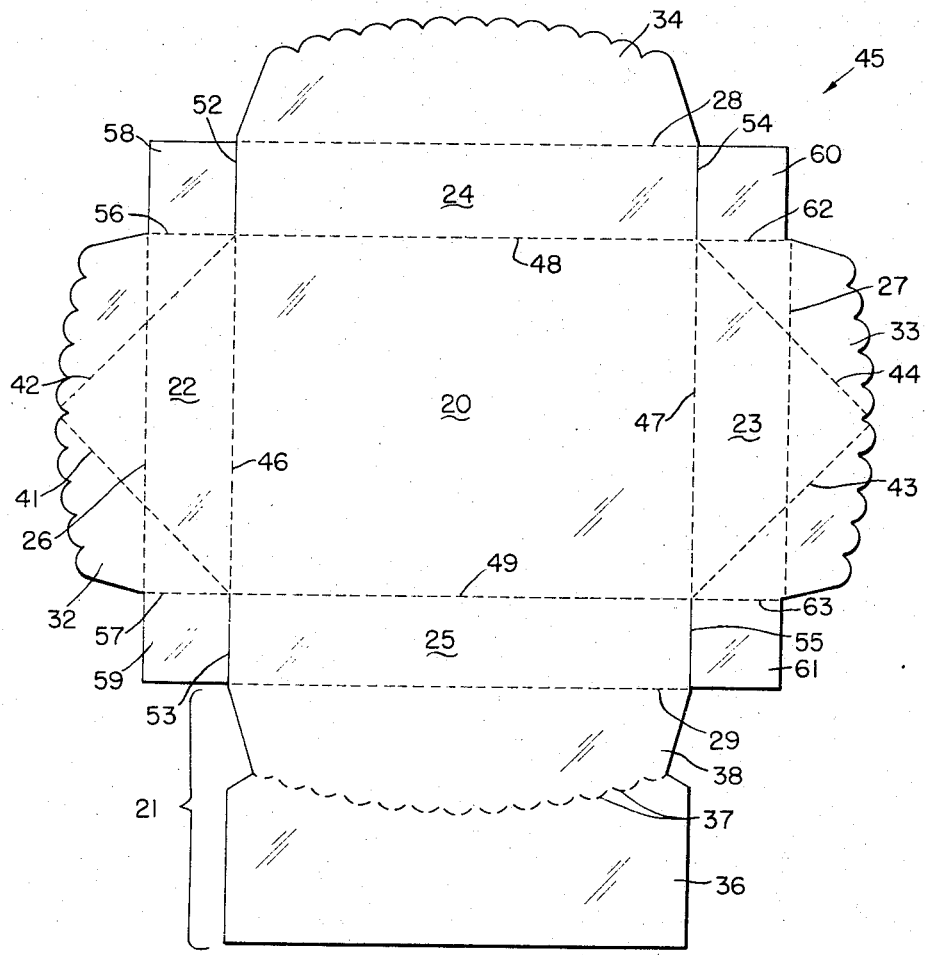
FIGURE 4 is a plan view of an improved container blank of this invention adapted to form the container illustrated in FIGURE 1.

While the various features of this invention are hereinafter illustrated and described as being particularly adaptable for packaging and serving food such as, for example, chicken dinners or the like, it is to be understood that the various features of this invention can be utilized singly or in any combination thereof to provide containers for other articles as desired.

Therefore, this invention is not to be limited to only the embodiments illustrated in the drawings because the drawings are merely utilized to illustrate only one of the wide variety of uses of this invention.

In the exemplary embodiment of the invention illustrated in FIGURES 1–9, a food container 19 is shown having first wall means such as bottom wall 20 and a second wall or top wall 21 arranged generally opposite said bottom wall in spaced relation. Side wall means extends between such top and bottom walls and cooperates at its opposite ends therewith to form a closed container, the side wall means includes a pair of end walls 22 and 23 arranged at opposite ends of the bottom wall 20 and a pair of side walls 24 and 25 arranged at opposite sides of the bottom wall 20.

Generally, the side wall means includes an extended surface area means which forms the top wall 21 of the container during storage and transportation of the contained food; however, when the food is ready to be served for consumption the container is used as a dish by removing part of the extended area and using the remainder to extend the side wall means. Thus, the novel features of this invention provide a dual purpose food container.

In addition, the container 19 of this invention is adapted to initially contain frozen or uncooked food that can be removed from the container 19 to be subsequently cooked, and, thereafter, replaced in the container 19 of this invention whereby the container 19 will serve as an attractive serving dish or the like.

As will be apparent from FIGURES 1–3 of the drawings, the container walls are rectangular in shape with end walls 22 and 23 arranged parallel to and spaced apart from each other and side walls 24 and 25 also arranged parallel to and spaced apart from each other. One end of each wall 22, 23, 24 and 25 is attached to corresponding edges of bottom wall 20; and such walls are also attached to each other at their edges to form an open top container. While such walls may be separate units fastened to bottom wall 20 it is preferred that they be formed by extensions of the same sheet of foldable material.

Fold lines 26, 27, 28, and 29 are provided in the unattached ends of the side wall 22, 23, 24, and 25 respectively. Each fold line is generally parallel to bottom wall 20 and extends the full width of its respective side wall (note that the term "side wall" is also used broadly to include end wall). Each side wall 22, 23, and 24 has an unattached end flap 32, 33, and 34 commencing respectively at fold line 26, 27, and 28.

As illustrated particularly in FIGURE 2 for this embodiment of the invention, side wall 25 includes an extended surface in the unattached end thereof beyond fold line 29 which is of sufficient area to form top wall 21 when folded along its fold line 29 inwardly toward and generally parallel with bottom wall 20.

Means for removing an outer portion 36 of such extended surface area or top wall 21 are provided and include slit means such as a plurality of slits 37 in surface 21. Slits 37 are placed in top wall 21 generally in line with each other and outline such outer tear-off portion 36. Upon removal of such tear-off portion 36 the remainder of the extended surface provides a flap 38 similar to flaps 32, 33, and 34. Such flaps are shown folded vertically upwardly in FIGURE 3 to provide extensions for their respective side walls coextensive therewith to thus permit use of container 19 with such extended sides as a dish or basket.

Each extension flap 32, 33, 34, and 38 is the same width at its base as its respective wall; and all such flaps are preferably of generally equal upward extension and terminate in a scalloped edge arranged in an arcuate path as shown. The amount of upward extension and the particular configuration chosen for each scalloped edge is not controlling; however, both these factors should be consistent with giving maximum utility and proper balance in the appearance of container 19 consistent with the type of food to be stored and served in such container.

In the embodiment of the invention, as shown particularly in FIGURES 1–3 the container may be made of any suitable foldable material; however, in this example the outside surface thereof is laminated with a sheet of metallic foil being suitably treated to give the appearance of a basket weave. The basket weave appearance plus the scalloped edges enable use of the container of this invention for promoting sale of a food such as chicken as a "chicken in the basket."

Container 19 includes means for folding such container flat while empty without disassembly thereof. Such means is illustrated as converging fold lines 41 and 42 in end wall 22 and converging fold lines 43 and 44 in end wall 23. The portion of each end wall on the outside of each respective converging fold line is folded inwardly along with the adjoining side wall to thus collapse the container into a flat condition. With the empty container in such a flattened condition it is much easier to handle and store.

While as previously mentioned the container can be formed in any suitable manner and from any suitable material, the embodiment of the container illustrated in FIGURES 1–3 is formed from the container blank 45 illustrated in FIGURE 4 made of cardboard or the like and having a side such as the exposed surface thereof laminated with metallic foil, such as aluminum-containing metallic foil or the like. Depending upon the application, such metallic foil may be suitably colored, embossed, imprinted, or remain plain as desired.

Blank 45 is suitably cut and scored to define five foldably connected rectangular walls 20, 22, 23, 24, and 25 defining a bottom wall, and four sides walls respectively. Side wall 25 has a fold line 29 therein beyond which the elongation thereof forming top wall 21 extends. Such elongation has a plurality of slits 37 defining a tear line having a scalloped configuration. The outer portion 36 of the extended area forming top wall 21 is torn off at slit lines 37 leaving a remaining portion or flap 38 which folds about fold line 29 previously mentioned.

Each wall 22, 23, and 24 has a fold line 26, 27, and 28 respectively about which a respective extension flap 32, 33, and 34 thereof is folded to provide an extension for its associated side wall. Blank 45 also has fold lines 46, 47, 48, and 49 at the base of walls 22, 23, 24, and 25 respectively and about which such walls are folded vertically.

Side wall fastening tabs are provided for fastening the side walls together as will be presently described. It will be apparent that such tabs may be an integral part of several combinations of such side walls.

Blank 45 has cuts 52 and 53 generally in line with the fold line 46 therein at the base of side wall 22 and cuts 54 and 55 generally in line with the fold line 47 therein at the base of side wall 23 permitting walls 22 and 23 to be folded vertically erect about their respective fold lines 46 and 47. The lateral extent of cuts 52 and 53 define the width of a pair of closure tabs 58 and 59 in wall 22. Such tabs fold about fold lines 56 and 57 respectively in wall 22 and are fastened as with glue to adjoining side walls 24 and 25. Likewise the lateral extent of cuts 54 and 55 define the width of a pair of closure tabs 60 and 61 which fold about fold lines 62 and 63 respectively in wall 23 and are glued to adjoining side walls 24 and 25 respectively such that with all flaps extended vertically an open-ended (i.e. open top) container is formed.

Food is placed in the open container thus formed from blank 45 prior to folding flaps 32, 33, and 34 and top wall 21 in a common plane parallel to bottom wall 20 and prior to sealing of such container.

To permit collapse of the container thus erected and with closure tabs 54, 55, 60, and 61 glued or fastened in place, a pair of fold lines is preferably provided in each wall 22 and 23 both of which walls are adjacent wall 25. Wall 22 has a fold line 41 commencing at one inner corner thereof and another fold line 42 commencing at its opposite corner, such fold lines extend in a converging manner outwardly across wall 22 and its associated extension flap 32 and meet at the mid-point of the scalloped edge defining the terminal edge of flap 32. Likewise, wall 23 has a fold line 43 commencing at one inner corner thereof and another fold line 44 commencing at its opposite corner, such fold lines extending across wall 23 and its associated flap 33 and meeting at the mid-point of the scalloped edge of flap 33.

With the container erected from blank 45 and the closure tabs fastened in place such container may be collapsed by folding walls 24 and 25 toward each other while folding wall 22 outwardly through use of fold lines 41 and 42 and simultaneously folding wall 23 outwardly through use of fold lines 43 and 44.

In the embodiment of the invention of FIGURES 5 and 6 a container and its associated blank is illustrated which is basically similar to the container of FIGURES 1–4. In view of the similarity the description of this latter embodiment will be considerably abbreviated except for certain outstanding differences. Similar parts in both embodiments will be designated by the same numeral being followed in this latter embodiment by the reference letter "a".

FIGURE 5 illustrates a container such as a food container 19a having a rectangular bottom wall 20a and a plurality of side walls. Two of said side walls, 22a and 23a, will be referred to as end walls, and the other two side walls are designated 24a and 25a. Each of the side walls is generally rectangular in outline and has one end thereof attached to a corresponding edge of bottom wall 20a.

Each end wall 22a and 23a has an extension flap 32a and 33a respectively extending therefrom and foldable about a corresponding fold line 26a and 27a therein. Flaps 32a and 33a are generally the same width as the wall with which each is associated and both flaps preferably terminate in an arcuate scalloped edge.

Side walls 24a and 25a have fold lines 28a and 29a respectively therein generally parallel to bottom wall 20a and spaced apart therefrom. Both of the side walls 24a and 25a have unattached end portions thereof extending beyond their respective fold lines 28a and 29a about which such end portions are folded inwardly toward each other to overlap a small amount and thus form a top wall 21a of container 19a. Side walls 24a and 25a are also attached along portions of their sides to end walls 22a and 23a.

With walls 22a, 23a, 24a, and 25a extended vertically food is placed in container 19a. The end flaps 32a and 33a are then folded into a common plane parallel to bottom wall 20a while the unattached end portions of side walls 24a and 25a are also folded toward each other and overlapped into such common place, the overlapping portions of the side walls 24a and 25a being suitably secured together with adhesive or the like.

The outer end portions of each side wall 24a and 25a have slit lines 37a therein defining tear-off portions 35a and 36a at the terminal end of each respective side wall. Slit lines 37a are preferably arranged to define a decorative scalloped edge similar to the scalloped edge in each flap 32a and 33a. After container 19a has been used for food storage, the tear-off portions 35a and 36a are removed leaving extension flaps 34a and 38a (with their scalloped terminal edges) for side walls 24a and 25a respectively.

Extension flaps 32a, 33a, 34a and 38a are generally of equal height and when extended their configuration promotes use of a container as a serving basket or the like.

Container 19a also includes converging fold lines 41a and 42a in end wall 22a, and similar converging fold lines 43a and 44a in end wall 23a. Such converging fold lines permit the end walls and their respective extension flaps to be folded thereabout thus collapsing the end walls outwardly while simultaneously folding side walls 24a and 25a and their respective extensions one on top of the other against bottom wall 20a for ease of handling while empty.

The container of the embodiment illustrated in FIGURE 5 is formed from the container blank 45a illustrated in FIGURE 6 which is made of a foldable material such as cardboard preferably with a metallic foil such as aluminum-containing metallic foil laminated on one or both sides thereof.

Blank 45a is suitably cut and scored to define five foldably connected rectangular walls 20a, 22a, 23a 24a, and 25a defining a bottom wall and four side walls respectively as previously described. The blank in this embodiment of the invention includes an extended area or elongation 35a and 36a in side walls 24a and 25a respectively. Side walls 24a and 25a have fold lines 28a and 29a therein about which the elongations 35a and 36a respectively fold to form top wall 21a. The extended areas 35a and 36a each have a plurality of slits 37a therein defining a tear line for the outer portion of each wall 24a and 25a. Slits 37a are preferably arranged to outline a scalloped edge such that when areas 35a and 36a are torn off a pair of extension flaps 34a and 38a remain each having a scalloped terminal edge.

A pair of extension flaps 32a and 33a respectively for walls 22a and 23a are also cut in blank 45a, such flaps are folded about their respective fold lines 26a and 27a and have scalloped terminal edges similar to flaps 34a and 38a.

Blank 45a also has fold lines 46a, 47a, 48a, and 49a therein for side walls 22a, 23a, 24a, and 25a respectively which cooperate with their respective walls to enable erecting such walls vertically with respect to bottom wall 20a. Such side walls are held in position by closure tabs 58a, 59a, 60a, and 61a formed respectively by cuts 52a, 53a, 54a, and 55a and fold lines 56a, 57a, 62a, and 63a in a similar manner to the previous embodiment.

To permit collapse of container 19a as assembled from blank 45a, fold lines 41a, 42a, 43a, and 44a are provided in blank 45a; such fold lines enable collapse of an assembled container without requiring disassembly of any part thereof.

In the exemplary embodiment of the invention illustrated in FIGURES 7 and 9 similar parts will bear the same numeral designation as in the previous embodiments for similar components but followed by the letter designation "b" for this latter embodiment.

FIGURE 7 illustrates a container 19b having a first or bottom wall 20b, opposed side wall means 24b and 25b fastened thereto, and a second or top wall 21b fastened to the side walls 24b and 25b to define an open-ended tubular structure which is collapsible at juncture lines 28b, 29b, 48b, and 49b of the top, bottom, and side walls for flat storage while empty.

A pair of end walls 22b and 23b is provided and each end wall is fastened to bottom wall 20b and cooperates with top wall 21b to form a closed container.

As illustrated particularly in FIGURE 8 each end wall 22b and 23b has a wedge-shaped locking tab at each side edge thereof for cooperation with a corresponding slit in an adjoining side wall for closing the ends of container 19b. Each locking tab is preferably necked down abruptly a small fraction of an inch to define shoulders at each side of its wedge-shaped base and each cooperating slit corresponds in size to such necked down dimension enabling the shoulders to lock each tab into position once forced through a cooperating slit.

End wall 22b has locking tabs 58b and 59b cooperating with corresponding slits 58c and 59c in one end of side walls 24b and 25b respectively; similarly, end wall 23b has locking tabs 60b and 61b cooperating with corresponding slits 60c and 61c in the other end of side walls 24b and 25b respectively.

End walls 22b and 23b each have a respective fold line 26b and 27b therein spaced apart from bottom wall 20b by a distance about equal to the height of each side wall 24b and 25b. Furthermore, each end wall 22b and 23b has an extension flap 32b and 33b respectively extending beyond its associated fold line and terminating in a decorative terminal edge shown as a scalloped edge in this example.

It will be seen that either end wall 22b and 23b may be fastened closed by its respective tabs and by placing its associated extension flap against and coextensive with top wall 21b while opening the other end wall outwardly for packing of food in container 19b. Once the container is packed the other end wall is similarly closed and sealed.

Top wall 21b has a plurality of slit lines 37b therein outlining a generally centrally located tear-out section 36b having a scalloped outline and extending across the full length of top wall 21b. Upon removal of tear-out section 36b the remaining portions of said top wall to either side of the tear-out section 36b define extension flaps 34b and 38b for side walls 24b and 25b respectively.

It will be apparent that the extension flaps 34b and 38b thus formed also extend the full length of their associated side walls while providing vertical extensions therefor similar to flaps 32b and 33b while also terminating in a decorative scalloped edge.

The container of the embodiment of the invention illustrated in FIGURES 7 and 8 is made from the container blank 45b illustrated in FIGURE 9 which is made of a single sheet of foldable material having a metallic foil laminated to a side thereof.

Blank 45b is suitably cut and scored to define six foldably connected rectangular walls such as a bottom wall 20b, a top wall 21b, and four side walls 22b, 23b, 24b, and 25b. A projection 65b is provided in such blank the outside of which is adapted to be suitably fastened at 65b to the inside edge of bottom wall 20b. Upon fastening such projection 65b at 66b and folding such blank along a plurality of fold lines 28b, 29b, 48b, and 49b provided therein, it will be seen that an open-ended tubular structure is thus formed.

Blank fold lines 26b and 46b are provided defining end wall 22b and its associated extension flap 32b. Similarly, fold lines 27b and 47b define end wall 23b and its associated extension flap 33b as illustrated in the drawing.

Means for fastening each end wall in position comprise locking tab means and slits provided in blank 45b as will be presently described. End wall 22b has a pair of wedge-shaped locking tabs 58b and 59b extending therefrom which fold about fold lines 70b and 71b respectively. Tabs 58b and 59b cooperate with corresponding slits 58c and 59c in side walls 24b and 25b respectively. End wall 23b has a pair of wedge-shaped locking tabs 60b and 61b extending therefrom which fold about fold lines 72b and 73b respectively. Tabs 60b and 61b cooperate with slits 60c and 61c in side walls 24b and 25b to provide fastening means for end wall 23b.

It will be apparent from the drawing of blank 45b that side wall 25b has lateral extensions 76b and 77b at either end thereof to provide strength to its locking slits. Extensions 76b and 77b are folded about fold lines 78b and 79b respectively and have cut-out portions thereon enabling locking tabs 59b and 61b respectively to be cut from adjacent blank material. Likewise, side wall 24b has lateral extensions 82b and 83b therein for a similar reason. Such extensions are folded about fold lines 84b and 85b respectively.

In this embodiment of the invention note particularly that the slit lines 37b define a tear-out area 36b that is centrally located in top wall 21b and extends across the full dimension thereof. The extension flaps 34b and 38b defined upon removal of such tear-out area provided extensions for their respective side walls as previously described.

It should also be pointed out that in all embodiments of this invention the area of the top wall that is torn away may be used for identification of the food item in the container, pricing thereof, advertising or the like such that upon removal of such area and extension of the extension flaps the entire container will have a coordinated, well balanced, and pleasing appearance.

Thus it is seen that an improved container is provided by this invention which can be folded flat while empty, which is easily erected without complicated assembly operations by the user thereof, and which is useful to store and transport food as well as subsequently provide a unique and attractive deep serving dish especially adapted to the particular food previously stored therein.

Further, this invention provides improved blanks for forming such containers or the like.

While the form of the invention now preferred has been disclosed as required by statute, other forms may be used, all coming within the scope of the claimed subject matter which follows.

What is claimed is:

1. A preassembled collapsible container comprising bottom wall means, top wall means arranged opposite said bottom wall means and spaced apart therefrom, side wall means extending between and cooperating at its opposite ends with said bottom and top wall means respectively to form a closed container, and weakening means in said top wall means defining a tear out area thereof such that upon removal of said tear out area the remainder of said top wall means is free to be folded outwardly to substantially vertically extend said side wall means adjoining thereto and define a serving receptacle.

2. A container comprising a bottom wall, a top wall arranged generally parallel to said bottom wall and spaced apart therefrom, a pair of spaced apart end walls extending between said bottom and top walls with each being fastened at one end to an edge of said bottom wall and extending upwardly therefrom and cooperating with said top wall, a pair of spaced apart side walls extending between said bottom and top walls with each being fastened at one end to said bottom wall and at each side thereof with an adjacent end wall and at its opposite end with said top wall, and slit means in said top wall outlining a tear out area thereof such that upon removal of said tear out area the remainder of said top wall is free to be folded outwardly to provide side wall extensions whereby said container provides a serving receptacle.

3. A container as set forth in claim 2 in which each of said end walls has a fold line therein and a flap extending beyond each fold line which is folded parallel to said top wall prior to removal of said tear out area, each flap being foldable outwardly to substantially extend its respective end wall.

4. A preassembled collapsible container comprising a bottom wall, side wall means having one end thereof attached to said bottom wall, fold line means in said side wall means generally parallel to said bottom wall and about which the end of said side wall means opposite said one end is folded in a plane generally parallel to said bottom wall to form a top wall of said container, and means for removing a portion of said top wall and thus utilize the remainder of said top wall as substantially vertical extension means for said side wall means and provide a serving receptacle.

5. A preassembled collapsible container comprising a bottom wall, a plurality of side walls each having one end thereof attached to said bottom wall, a fold line in each of said side walls generally parallel to said bottom wall and spaced apart therefrom defining an extension flap in each side wall extending outwardly thereof which is adapted to be folded inwardly into a plane generally parallel to said bottom wall to define a top wall for said container, one of said extension flaps extending from one side wall comprising an elongated extension flap which extends the major part of the distance across said top wall, and weakening means in said elongated extension flap defining a tear off area at the extremity thereof so that upon tearing off said area an extension flap for said one side wall is defined which is similar to the extension flaps extending from the other side walls, said extension flaps being free to be folded outwardly in said container to provide vertical extensions for their respective walls and define a serving receptacle.

6. A container as set forth in claim 5 in which said extension flaps extending beyond said side walls, including said one extension flap after removal of said tear off area, are of generally equal extension and define said serving receptacle having side walls of equal extended height.

7. A preassembled collapsible container comprising a bottom wall, a pair of end walls attached to opposite end edges of said bottom wall, a fold line in each of said end walls generally parallel to said bottom wall and spaced apart therefrom defining the top edge of each associated end wall, an end wall extension flap extending beyond each of said fold lines, a pair of side walls attached to opposite side edges of said bottom wall and the side edges thereof attached to associated edges of said end walls, a fold line in each of said side walls generally parallel to said bottom wall and spaced apart therefrom defining the top edge of each associated side wall, an elongated side wall extension flap extending from each of said side walls, said extension flaps being adapted to be folded into a common plane generally parallel to said bottom wall to define a top wall for said container, said elongated side wall extension flaps covering substantially the entire area of said top wall, and slit means in each of said elongated extension flaps defining a tear off area at the extremity thereof, and upon removal of each of said tear off areas an extension flap is defined for each of said side walls which is similar to said end wall extension flaps, said extension flaps being foldable outwardly to provide substantially vertical extensions for their respective walls and define a serving receptacle.

8. A container as set forth in claim 7 further comprising a pair of converging fold lines in each of said end walls about which the portion of each end wall on the outside thereof and the side wall adjoining thereto are folded such that said container is folded flat for shipment and storage from a completely erected condition while keeping all parts thereof assembled together.

9. A food container comprising a bottom wall, end walls each having one end thereof attached to said bottom wall, fold line means in each end wall generally parallel to said bottom wall and spaced apart therefrom and about which the unattached end of each end wall is folded inwardly in a plane generally parallel to said bottom wall during carrying of food in said container, each unattached end of each end wall being adapted for folding outwardly coextensive with its respective end wall, side walls each having one end thereof attached to said bottom wall and a portion of the sides thereof attached 19. A container blank as set forth in claim 18 in which said weakening means comprises spaced apart slit means, and further comprising locking tab means extending from each end of each end wall, and cooperating locking slit means in said blank adjoining each end of each side wall, said tab and slit means cooperating to hold said resulting container assembled together.

References Cited

UNITED STATES PATENTS

| | | | |
|---|---|---|---|
| 504,824 | 9/1893 | Cook | 229—36 |
| 1,114,040 | 10/1914 | Richardson | 229—33 |
| 1,667,864 | 5/1928 | Peterson | 229—33 |
| 1,667,870 | 5/1928 | Peterson | 229—33 |
| 2,343,222 | 2/1944 | Nelson | 229—51 |
| 2,834,531 | 5/1958 | Struble | 229—33 |
| 2,982,464 | 5/1961 | Wingate | 229—35 |
| 3,038,463 | 6/1962 | Daymon | 229—33 |

FOREIGN PATENTS

| | | |
|---|---|---|
| 21,682 | 3/1936 | Australia. |
| 664,202 | 6/1963 | Canada. |
| 8,765 | 6/1908 | France. |

DAVIS T. MOORHEAD, *Primary Examiner.* to said end walls, fold line means in each side wall generally parallel to said bottom wall and spaced apart therefrom and about which the unattached end thereof is folded in a plane generally parallel to said bottom wall to form a top wall of said food container, and means for removing a portion of each side wall portion forming said top wall and thus utilize the remainder thereof extending beyond each fold line means as a substantially vertical extension of its respective side wall whereby a serving receptacle is provided.

10. A food container comprising a bottom wall, a pair of end walls each having one end thereof attached to said bottom wall, a fold line in each end wall generally parallel to said bottom wall and spaced apart therefrom and about which the unattached end of each end wall is folded to define an end wall flap thereof with each flap having a terminal scalloped edge, each end wall flap being folded inwardly into a plane generally parallel to said bottom wall during carrying of food in said container and outwardly to provide a substantially vertical extension for its respective end wall, a pair of side walls having one end thereof attached to said bottom wall and a portion of the sides thereof attached to said end walls, a fold line in each side wall generally parallel to said bottom wall and spaced apart therefrom and about which the unattached end of each side wall is folded in a plane generally parallel to said bottom wall to form a top wall of said container, and slit lines in the outer end of each unattached end of said side walls defining a tear off portion for each side wall, said slit lines defining a terminal scalloped edge for the remaining portion of each side wall and such remaining portion providing a side wall flap for each side wall similar to said end wall flaps, each side wall flap being foldable outwardly about its respective fold line to provide a substantially vertical extension for and coextensive with its respective side wall whereby a serving receptacle is provided.

11. A preassembled container collapsible while empty and readily erected for use comprising a bottom wall, a pair of opposed side walls fastened to said bottom wall, a top wall fastened to said side walls to define an open ended tubular structure which is collapsible at the juncture of said top, bottom, and side walls for flat storage while empty, a pair of end walls fastened to said side walls and bottom wall and cooperating with said top wall to form a closed container, each of said end walls having an extension flap folded coextensive with said top wall when said container is closed, a locking tab at each side edge of said end walls, a cooperating slit in each edge of each side wall corresponding with a respective locking tab for closing the ends of said container, and slit lines in said top wall outlining a generally centrally located tear out section in said top wall which is of equal length with said side walls such that upon removal of said tear out section each side wall has a remaining flap portion similar to each flap in said end walls whereby such flaps are folded outwardly to provide substantially vertical extensions for their respective walls whereby a serving receptacle is provided.

12. A container blank being cut and scored and adapted to be assembled together to define a resulting collapsible container, said blank comprising, a rectangular bottom wall, four side walls foldably connected to said bottom wall, and an extension flap extending from each of said side walls and adapted to be folded into a common plane with the other extension flaps to define a top wall for said resulting container, one of said side walls having an elongated extension flap extending practically completely across said top wall of said resulting container, said elongated extension flap having weakening means therein defining a tear off area at the extremity thereof so that upon tearing off said area an extension flap for said one side wall is defined which is similar to the extension flaps extending from the other side walls, and said extension flaps being free to be folded outwardly in said resulting container to provide vertical extensions for their respective walls and define a serving receptacle.

13. A container blank as set forth in claim 12 in which said walls are rectangular and include a pair of fold lines in each side wall adjoining said one side wall, with a fold line of each pair commencing at one inner corner and the other fold line of each pair commencing at the opposite inner corner of each adjoining side wall and extending toward each other thereacross and across the extension flap associated therewith such that in said resulting container said fold lines in said adjoining side walls enables said adjoining side walls to be flattened substantially into a common plane with the remainder of said resulting container.

14. A container blank as set forth in claim 12 in which each of said extension flaps is hinged about a fold line defining the outer edge of its associated side wall and each extension flap is substantially of equal height and terminates in a scalloped edge extending in an arc across the full length of each respective wall.

15. A container blank as set forth in claim 13 in which said fold lines extending across each adjoining side wall meet at the mid-point of the outer edge of its respective extension flap.

16. A container blank being cut and scored and adapted to be assembled together to define a resulting collapsible container, said blank comprising, a rectangular bottom wall, a pair of end walls foldably connected to opposite end edges of said bottom wall, an end wall extension flap extending from each of said end walls, a pair of side walls foldably connected to opposite side edges of said bottom wall, an elongated side wall extension flap extending from each of said side walls, said extension flaps being adapted to be folded into a common plane to define a top wall for said resulting container, said elongated side wall extension flaps being of substantially equal extension and adapted to cover the entire top wall of said resulting container, each of said elongated side wall extension flaps having weakening means therein defining a tear off area at the extremity thereof so that upon tearing off each of said areas an extension flap is defined for each side wall which is similar to said end wall extension flaps, and said extension flaps being free to be folded outwardly in said resulting container to provide vertical extensions for their respective walls and define a serving receptacle.

17. A container blank as set forth in claim 16 in which said walls are rectangular in outline and include a pair of fold lines in each of said end walls, with a fold line of each cooperating pair commencing at one inner corner of its associated end wall and the other fold line of each cooperating pair commencing at the opposite inner corner of said associated end wall and each cooperating pair of fold lines extending toward each other across their end wall and associated extension flap, such that in said resulting container said fold lines in said end walls enable said end walls to be flattened substantially into a common plane with the remainder of said resulting container.

18. A container blank being cut and scored and adapted to be assembled together to define a resulting container, said blank comprising, a bottom wall, a pair of end walls, a pair of side walls, a top wall, an extension flap extending from each of said end walls, and weakening means in said top wall defining a tear out area in the center portion thereof such that upon removal of said tear out area from said resulting container a pair of portions remain in said top wall and each remaining portion provides an extension flap for an associated one of said side walls similar to said extension flaps provided in said end walls, said extension flaps being free to be folded outwardly in said resulting container to provide vertical extensions for their respective walls and thereby define a serving receptacle.